Patented Nov. 13, 1945

2,388,983

UNITED STATES PATENT OFFICE 2,388,983

PROCEDURE OF EXTRACTING ALUMINUM HYDRATE FROM CLAY

Sanford C. Lyons, Bennington, Vt., assignor to Georgia Kaolin Company, Elizabeth, N. J., a corporation of Georgia No Drawing. Application June 3, 1944, Serial No. 538,705

5 Claims. (Cl. 23—119)

The present invention has for its object to obtain from clay aluminum hydrate in substantially pure condition, that is, so free from impurities that the metal aluminum may be made from it by standard methods. A high degree of purity is require for alumina provided for this purpose, and in respect to iron and potassium particularly the material must be almost chemically pure.

I have heretofore devised and disclosed in a Patent No. 2,354,133, issued July 18, 1944, entitled "Process for producing alumina from clay," a procedure by which alumina is obtained in the desired degree of purity from crude kaolins. The present invention comprises a different mode of treatment having advantages of improved efficiency and economy, resulting in aluminum hydrate, equally free of mineral impurities, from which alumina is obtainable by calcination.

The raw material which I prefer to use in the present procedure, as in that of the prior application, is a crude kaolin from either Sandersville, the Dry Branch, or the Andersonville districts of central Georgia; but the procedure is not restricted to those clays only and is applicable to others of which the composition varies more or less widely.

According to the present procedure, the clay used as the raw material is first mixed as intimately as possible with ammonium sulphate. Depending upon the nature of the particular clay used, the amount of ammonium sulphate employed is from two to five times the weight of the clay. To facilitate mixing the ammonium sulphate is dissolved in water with the use of just enough water to cause the clay, when thoroughly mixed with it, to form a plastic dough. The solution is worked into the mass of clay very thoroughly so as to achieve as nearly as possible the result of bringing every individual particle of the clay into direct contact with ammonium sulphate, since the chemical efficiency of the process is enhanced in direct proportion to the intimacy and thoroughness of the mixture. The resultant plastic mass is then extruded in the form of ribbons or noodles of small and uniform cross sectional area and dried in this form.

The dried ribbons of clay and ammonium sulphate mixture are then fed into a suitable furnace and there roasted for a period of approximately one hour at a temperature in the range between 350° C. and 420° C., preferably at approximately 380° C. As the procedure is now carried on, the gaseous products of combustion from the fuel (which may be gas, oil or other fuel), which is preferably burned in an auxiliary combustion chamber, are allowed to pass through the roasting chamber and to mingle with the fumes evolved from the clay mixture. However, it is not essential that these gases pass through the roasting chamber, provided only that they are allowed to mingle in some manner, as in a common stack, with the fumes from the clay and ammonium sulphate mixture.

During the roasting process, the physical appearance of the clay mixture changes and a considerable part of the mass becomes whiter and of markedly less dense texture. Apparently part of the ammonium sulphate vaporizes and is dissociated. Its ammonium radical, being more volatile, escapes into the gases of the combustion and combines with the carbon dioxide present in them, forming ammonium carbonate and/or ammonium bicarbonate. The sulphuric oxide radical is ionized and made highly reactive. It remains and vigorously attacks the aluminous component of the clay, thereby forming aluminum sulphate. Inasmuch as a large excess of ammonium sulphate has been provided, completion of the reaction with clay leaves enough ammonium sulphate to combine with the aluminum sulphate and form the double sulphate which is more commonly known as ammonium alum.

The gases from the roasting furnace are passed through an aqueous scrubbing bath wherein the ammonium compounds, principally ammonium carbonate, are dissolved; and the resulting aqueous solution is preserved for subsequent use, as later described. The nitrogen content of the products of combustion, being inert, passes off. Whatever water vapor is present is added to the water in the scrubber, and soluble impurities in the gases are ordinarily insufficient in quantity to be objectionable. If an undesirable amount of such impurities should be dissolved, they can be separated out by precipitation and filtration, or other suitable treatment of known character.

The roasting period above named is ordinarily sufficient to effect the reaction of the sulphur compounds with as much of the clay in the batch as possible for economical and efficient commercial practice. The solid matter remaining in the furnace is then dumped into water and disintegrated, whereby the soluble ammonium alum is leached out. This is separated from the insoluble residue of siliceous matter and unreacted clay by decantation, filtration, or other suitable means.

This ammonium alum solution contains impurities of which the most obnoxious are the oxides of iron. Elimination of ferruginous compounds is effected by differential crystallization, inasmuch as the alum is much less soluble in water than the iron compounds. But before the hot solution is allowed to cool sufficiently to crystallize the alum, it is treated by the addition of a quantity of sodium hyposulphite ($Na_2S_2O_4$) sufficient to react with all of the iron present. This amount may be substantially or roughly equal to the weight of ferric oxide in the solution.

It may be noted in passing that sodium hyposulphite, so-called, is more accurately designated as sodium dithionite. The latter term has been devised in accordance with a recently corrected nomenclature of chemical compounds. However, both terms designate the same substance.

This sodium compound has the important effect of making the ferruginous impurities present in the solution more soluble and more stably soluble. Its reaction in the solution yields decomposition products, possibly sulphides, etc., which combine with certain heavy metal salts that may be present in the solution, forming insoluble compounds which are capable of easy separation. The resulting precipitates are removed by filtration while the solution retains (from the heating effect of the roasted clay mass that has been dumped into it) a temperature in the neighborhood of 80° C. or higher.

Then the filtered solution is cooled so as to allow the aluminum ammonium sulphate to crystallize. Preferably the solution while cooling is stirred so that the resulting crystals will be fine, in order to diminish the tendency for an entrapment of mother liquor within the crystals. When separated cleanly from the mother liquor, the solid crystals, upon analysis, show a surprisingly low content of iron and practically no silica, calcium or other impurities.

Separation of the crystals may be effected in various ways. One mode, which is extremely efficient both functionally and economically, is to pass the crystal slurry through a continuous operating centrifuge of the screen type having means for propelling the crystals longitudinally along the inner face of the rapidly rotating screen. Wash water may be sprayed against the rotating mass of crystals to remove vestiges of mother liquor adhering to their surfaces. Any impurities which may be present in the crystal slurry will be contained almost entirely in solution in the mother liquor. Hence the more thoroughly and effectively the mother liquor is eliminated in the centrifuge, the greater will be the purity of the resulting alum crystals and the less will be the number of recrystallization stages needed to obtain the desired degree of ultimate purity.

If the alum crystals so obtained are not sufficiently pure, they may be further refined by being dissolved in hot water and by a repetition of the procedure last described. In repeating the treatment with sodium hyposulphite a smaller proportional amount can be used than in the first treatment. The steps of dissolving, treating with sodium hyposulphite and recrystallizing can be repeated as many times as the quantity of iron present requires, and until ammonium alum crystals are obtained capable of yielding alumina, as pure as, or purer than, that obtained from bauxite, by the conventional Bayer process.

The refined and purified ammonium alum is again dissolved in hot water and mingled with the solution of ammonium carbonate obtained from the fumes delivered from the roasting furnace. Reactions between these compounds result in the formation of a precipitate of aluminum hydrate and the regeneration of a solution of ammonium sulphate. The ammonium radicals originally contained in the ammonium carbonate react with the sulphate radicals originally contained in the ammonium alum solution, forming ammonium sulphate. The relative proportion of ammonical liquor added to the alum solution is according to the ordinary metathetical proportions and normally is of amount sufficient to react with all of the alumina present in the form of alum.

The aluminum hydrate is separated from the ammonium sulphate solution by filtration. It may be purified so far as necessary by repulping and further filtration. It is then dried, and may be calcined to form alumina suitable to be converted into the metal aluminum by electrolytic or other procedures.

The ammonium sulphate solution after separation from the aluminum hydrate is concentrated and thereby prepared for use with the next batch of clay. It becomes the agent which is mixed with the raw clay in the first step of the hereindescribed procedure.

What I claim and desire to secure by Letters Patent is:

1. The method of producing aluminum hydrate from clay, which comprises mixing clay intimately with water and ammonium sulphate to form a plastic mass, forming from the resulting mixture bodies of small and substantially uniform cross-sectional area, drying such bodies, roasting the dried bodies at a temperature and for a time sufficient to volatilize and dissociate a portion of the ammonium sulphate and to cause reaction between the clay and ammonium sulphate with the formation of the double sulphate of aluminum and ammonium, at the same time causing dissociated ammonia to combine with carbon dioxide from the products of combustion of the fuel burned to furnish roasting heat, passing the gases and fumes from the roasting furnace through water and thereby forming a solution of ammonium carbonate, leaching the solid residue of the roasted mass with water to form a solution of ammonium alum, adding sodium dithionite to said solution, crystallizing the ammonium alum content of the solution and separating it from the mother liquor, redissolving the alum crystals, combining the resulting solution with the ammonium carbonate solution obtained in the scrubbing step, thereby forming a precipitate of aluminum hydrate and a solution of ammonium sulphate, and separating the precipitate from the solution.

2. The method of obtaining from clay a material suitable for the manufacture of aluminum by electrolytic process, which comprises making an intimate mixture of clay and ammonium sulphate, roasting said mixture by heat obtained from the combustion of fuel, conducting the fumes thereby driven from the clay mixture and the products of combustion to a scrubber and producing therein a solution of ammonium carbonate, dumping the roasted clay mixture into water and thereby leaching ammonium alum from the mixture, adding sodium dithionite to said alum solution while the latter is hot, cooling the solution until ammonium alum crystallizes, separating the crystals of alum from the mother liquor, treating the recovered ammonium alum with the ammonium carbonate solution derived from the scrubbing step, thereby forming a precipitate of aluminum hydrate and a solution of ammonium sulphate, separating the precipitate from the solution, and concentrating the solution for repeated use as the agent to be mixed with raw clay.

3. The method of treating clay to obtain aluminum hydrate, which comprises heating an intimate mixture of clay and ammonium sulphate in the presence of carbon dioxide at a temperature such as to cause reactions producing ammonium carbonate in the gaseous state and ammonium alum in the solid mixture of clay and ammonium sulphate, dissolving the ammonium carbonate gas and ammonium alum content of the roasted mass in separate bodies of water, treating the solution of ammonium alum, while hot, with sodium dithionite, cooling the alum solution and thereby causing crystals of purified ammonium alum to form, separating such crystals from the mother liquor, treating the recovered aluminum alum in liquid phase with the solution of ammonium carbonate to produce a precipitate of aluminum hydrate and a solution of ammonium sulphate, and separating said precipitate from said solution.

4. In the procedure of obtaining aluminum hydrate from clay, the steps of roasting an intimate mixture of clay and ammonium sulphate at a temperature sufficiently high to cause a reaction which produces ammonium alum, leaching ammonium alum from the roasted mass, treating the ammonium alum solution, while hot, with sodium dithionite, cooling the solution and crystallizing therefrom purified ammonium alum, dissolving the ammonium alum crystals in water, and reacting the resulting solution with ammonium carbonate to form aluminum hydrate and ammonium sulphate.

5. In the method of preparing clay for the manufacture of aluminum and other purposes, the steps of mixing clay intimately with water and a quantity of ammonium sulphate of which the weight on the dry basis is from two to five times the weight of the clay, roasting the mixture at a temperature sufficiently high to drive off the ammonia and produce the double sulphate of aluminum and ammonium, leaching out the soluble double sulphate in the roasted clay with hot water, adding sodium dithionite to the solution, separating the ammonium aluminum sulphate from the solution, and treating the separated ammonium aluminum sulphate with ammonium carbonate to obtain aluminum hydrate.

SANFORD C. LYONS.